(12) United States Patent
Papadakis

(10) Patent No.: US 9,566,992 B2
(45) Date of Patent: Feb. 14, 2017

(54) INTEGRATED BANANA TRANSPORT SYSTEM

(71) Applicant: Lazaros Papadakis, Iraklio Crete (GR)

(72) Inventor: Lazaros Papadakis, Iraklio Crete (GR)

( * ) Notice: Subject to any disclaimer, the term of this patent is extended or adjusted under 35 U.S.C. 154(b) by 0 days.

(21) Appl. No.: 14/913,171

(22) PCT Filed: Sep. 17, 2014

(86) PCT No.: PCT/GR2014/000053
§ 371 (c)(1),
(2) Date: Feb. 19, 2016

(87) PCT Pub. No.: WO2015/040438
PCT Pub. Date: Mar. 26, 2015

(65) Prior Publication Data
US 2016/0200338 A1    Jul. 14, 2016

(30) Foreign Application Priority Data
Sep. 20, 2013 (GR) .............................. 20130100533

(51) Int. Cl.
*B62B 3/04* (2006.01)
*B62B 3/00* (2006.01)
(Continued)

(52) U.S. Cl.
CPC ............... *B62B 3/005* (2013.01); *A01D 90/00* (2013.01); *B62B 3/02* (2013.01); *B62B 3/04* (2013.01);
(Continued)

(58) Field of Classification Search
CPC .............. B62B 1/06; B62B 1/14; B62B 1/142; B62B 1/22; B62B 1/26; B62B 3/04; B62B 3/10; B62B 3/006; B62B 2203/02; B62B 2203/60; B62B 2202/03; A47B 75/00; B65D 61/00; B65D 61/02; A47F 7/0071; A47J 43/18; A01D 2090/005
See application file for complete search history.

(56) References Cited

U.S. PATENT DOCUMENTS 1,078,804 A * 11/1913 Royse ................... A47G 19/30
                                                                 211/133.6
1,385,015 A *  7/1921 Lombardo ............... B65D 9/06
                                                                     217/52
(Continued)

FOREIGN PATENT DOCUMENTS

ES      2038534 A1  *  7/1993
FR      2711625     *  5/1995

*Primary Examiner* — Emma K Frick
(74) *Attorney, Agent, or Firm* — Dowell & Dowell, PC

(57) ABSTRACT

Integrated banana transport system from the banana plantation to the retail point of sale. The system consists of twelve baskets and a wagon. A bunch of bananas is placed on each basket. The basket can be used at all stages of harvesting, washing, processing, storage, transportation and final disposal. The contact with the bananas, which causes an aesthetic degradation of the product, is minimized. The bunch of bananas is placed on the basket. The upper part of the stalk is nailed on the nail (1) of the hanger (2), while the lower part is placed on the embossed area of the basket's base (3). Beams are placed at the corners of the wagon's base where the rack is attached at the desired height. Six baskets are placed at the bottom of the wagon's base and six on the rack. The basket and the wagon can be assembled and disassembled by hand without any need of tools. The disassembled system occupies minimal space, making less expensive the return to the plantation.

7 Claims, 1 Drawing Sheet

(51) Int. Cl.
*A01D 90/00* (2006.01)
*B62B 3/02* (2006.01)
*B62B 3/10* (2006.01)
*A47F 7/00* (2006.01)

(52) U.S. Cl.
CPC .......... *B62B 3/10* (2013.01); *A01D 2090/005* (2013.01); *A47F 7/0071* (2013.01)

(56) References Cited

U.S. PATENT DOCUMENTS

| | | | | |
|---|---|---|---|---|
| 1,414,712 A * | 5/1922 | Schmidt | | A47F 7/0071 135/124 |
| 1,671,006 A * | 5/1928 | Bartlett | | B65D 63/18 248/317 |
| 1,715,603 A * | 6/1929 | Kamman | | A47F 5/01 211/133.6 |
| 1,976,568 A * | 10/1934 | Lavezzorio | | B65D 81/07 248/694 |
| 2,038,903 A * | 4/1936 | Rakatzky | | A47F 7/0071 211/169 |
| 2,066,478 A * | 1/1937 | Lewin, Jr. | | A47F 5/10 211/182 |
| 2,614,704 A * | 10/1952 | Winslow | | B66C 1/12 211/1.57 |
| 2,644,598 A * | 7/1953 | Winslow | | B66F 9/12 414/607 |
| 2,658,610 A * | 11/1953 | Winslow | | B65G 17/20 198/681 |
| 2,738,086 A * | 3/1956 | Reich | | B62B 1/26 188/314 |
| 2,747,916 A * | 5/1956 | Reich | | B62B 1/26 294/106 |
| 2,764,305 A * | 9/1956 | Reich | | B62B 5/00 24/600.4 |
| 2,800,235 A * | 7/1957 | Reich | | B62B 1/14 280/47.27 |
| 4,412,483 A * | 11/1983 | Hoegh | | B26D 3/11 99/537 |
| 5,199,580 A * | 4/1993 | Bankier | | A01D 46/243 211/113 |
| 7,124,892 B2 * | 10/2006 | Garcia | | B65D 61/00 206/526 |
| 7,954,830 B2 * | 6/2011 | Begin | | B62B 3/04 280/47.35 |
| 8,579,126 B1 * | 11/2013 | Cole | | A47F 7/0071 211/175 |
| 9,162,528 B2 * | 10/2015 | Kroening | | B60B 33/0002 |
| 2003/0070525 A1 * | 4/2003 | Barnhart | | B26D 3/11 83/932 |

\* cited by examiner

INTEGRATED BANANA TRANSPORT SYSTEM

FIELD OF THE INVENTION

This present invention relates to an integrated banana transport system from the harvesting point where the bunch is cut from the tree up to the retail point of sale where the final consumer places the bananas to his shopping bag. The system consists of individual metallic stands (baskets) which are placed on a specially formed metallic pallet (wheeled wagon for transferring the stands). A bunch of bananas can be placed on each stand.

BACKGROUND OF THE INVENTION

From the harvesting point of the bananas up to the retail point of sale the bunch and the bananas are placed on different means for their transportation, process and storage. After the harvesting, hooks (in large scale plantations) or wagons (in small scale plantations) are usually used for the transportation to the washing and screening area. Afterwards bunches of bananas are placed in carton boxes, with a plastic sheet inside, for their transportation from the packing area to the retail point of sale. The boxes are stacked on pallets. Finally, at the retail point of sale, bananas are unpacked from the boxes and are placed on a bench.

The use of many transportation means demands handling of bunches which involves hand contact with the banana fruit. This contact stresses the banana fruit as bananas are very sensitive to knocks, pressure and friction with other objects. The result of this contact is fruit with lower commercial value comparing with fruit which hasn't been deteriorated by any mean. Also, the packing of the fruit cannot be reused which results in a constant financial charge of the product and an environmental impact.

DISCLOSURE OF THE INVENTION

The system consists of baskets and a wagon carrier for the baskets. A bunch of bananas is placed on a basket after harvesting. The bunch can stay on the basket till it reaches the retail point of sale where the final consumer can cut from the bunch the quantity of the bananas he wishes to buy (claim 1). The bunch can stay on the basket during all stages (harvesting, process, cleaning, storage and transportation) of the bananas. There is no need for the use of other means of handling, minimising the hand contact with the banana fruit. The basket can be used at the retail point of sale as it is (claim 6).

Baskets consist of two parts. One part is the base of the basket and the other is the securing part of the bunch. The base is square and has two tubes attached at the corners of the one diagonal. At another corner there is a formation which acts as a guide for the vertical beams of the wagon. The base has at least an area with strong embossing. The stalk is placed on this area. The embossing doesn't allow the bunch to spin or slip on the base (claim 3). The whole weight of the bunch is applied on the base of the basket on the embossed area.

The bunch of bananas stays stable on the basket from the hanger (the upper part of the basket). The hanger has a nail at the middle of the horizontal section where the upper part of the stalk is nailed (claim 2). Thus it is not possible for the bunch to oscillate on the basket and the bunch stays still. The appropriate dimensions of the ends of the hanger allow the placement of it in the base tubes. The final height of the hanger is not pre-defined but it solely depends from the length of the bunch of banana.

The wagon has parallelogram shape. Wheels are placed at the base of the wagon in order to ease the movement of the system. Six baskets can be placed on the base of the wagon. At the corners of the wagon's base, the baskets must be placed so that the corner formation of the baskets will fit with the wagon's base beam formations. After the placement of the six baskets the beams can be placed. There is a formation on the beams allowing the mounting of the rack. The formation is along the beam allowing the positioning of the rack to be at an adjustable height, according to the length of the bunch of bananas placed on the wagon's base, as the length of the stalks cannot be predefined.

On the rack there is the ability for six more baskets to be placed. Each wagon can carry twelve baskets. The system can return to the origin (without any bunch of bananas) disassembled, in order to minimize the space requirements (claim 5). Assembling and disassembling of the system can be carried out by hands, without the need of a tool (claim 4). The wagon has parallelogram shape. This allows the maximum exploit of the storage space, regardless the geometry of the storage space. The dimensions of the baskets and the wagon are such that the space of a refrigerator truck can be fully exploited (claim 7).

Advantages of the Invention

This system is able to carry the whole bunch of bananas from the harvesting point till the retail point of sale "as it is" and not in "hand groups". Furthermore, there is no need to change the transportation means of the bananas. So, the contact with the banana fruit is limited to the minimum. Also, using these baskets the contact between banana fruits or between the bunches is not possible. At the retail point of sale, the bunch of bananas can stay on the basket. As the banana fruit stays on the stalk and not on a bench in "hands" the unintended touch of the final consumer to the bananas is prevented resulting the preservation of the aesthetic value of the product.

The baskets and the wagons, after the completion of the sale cycle can be collected and returned to the harvesting point. Thus the need for disposable packing (e.g. carton boxes) is eliminated. Baskets can be manufactured by any material as wood or plastic, having the same dimensions and characteristics with the metallic ones.

The whole system is modular and the parts, which is consisted of, occupy very small space when they are disassembled. Thus, the transportation cost of the system back to the plantation of the bananas is very small, as the volume of the disassembled system is 12 times less than the assembled one.

The assembling and the disassembling of the parts, takes place by hand without the need of a tool (e.g. spanner or screwdriver). Also, the height of the basket is automatically adjusted according to the length of the bunch of bananas. The height of the wagon is also adjustable, as the beams and the rack have an appropriate formation making feasible the mounting height selection of the rack on the beams.

The baskets have an embossing area on their base where the bunch of bananas is placed, supporting the whole weight of the bunch. As the weight is supported by the base of the basket, the bunch of bananas is secured by nailing the upper part of the stalk on the nail of the basket's hanger. Thus, each bunch of bananas is supported and secured exclusively by the stalk.

The dimension ratio of the wagon's base allows the placement either lengthwise or widthwise in a typical food refrigerator truck. Due to this feature the exploitation of the space is maximized. As the wagon has wheels, the transportation and the movement in any storage place can be achieved without any motored mean.

The baskets can also be the showcase at the retail point of sale to the final consumer. Thus, the bananas can stay intact up to the end of the sale cycle. Also, as the bananas stay on the stalk and they are not in "hands" on a bench, the final consumer unintentional is prevented from repetitive touch the banana fruits.

FUNCTIONAL DESCRIPTION OF THE INVENTION

The baskets and the wagons are initially at the banana plantation. The bunch of banana is chopped from the plant and the upper part of the stalk is nailed on the nail of the basket's hanger. The bunch of banana is placed on the basket's base by placing the bottom part of the stalk on the embossing area of the base which allows the bunch to be securely placed. The height where the hanger will stay depends from the length of the stalk. The basket with the bunch of banana placed on the wagon, with the specially formed corner of the basket in contact with the wagon's corners.

After the placement of six baskets on the wagon's base, four beams are fitted on the corners of the wagon. The rack is attached and secured on the beams at the desirable height. Six more baskets can be placed on the rack.

The wagon can be used to transfer the bunches to the washing and screening of the banana fruits, to the storage (or the ripening room), even in the trucks or the containers for the transportation of the bananas to the retail point of sale. The basket can be placed on a table or a bench as a showcase for the sale to the final customer.

The baskets and the wagons can be disassembled and transported back to the banana plantation, occupying significantly less space. At the banana plantation they can be re-assembled in order to be used again.

Figure 1:
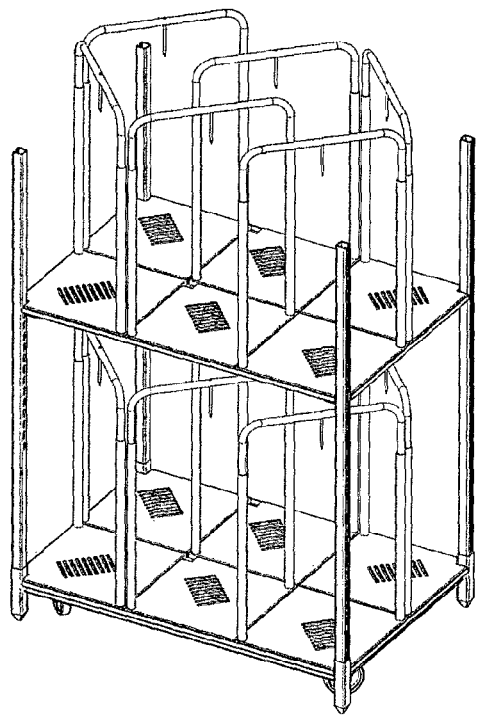
FIG. 1 shows a wagon with twelve baskets placed on it.
Figure 2:
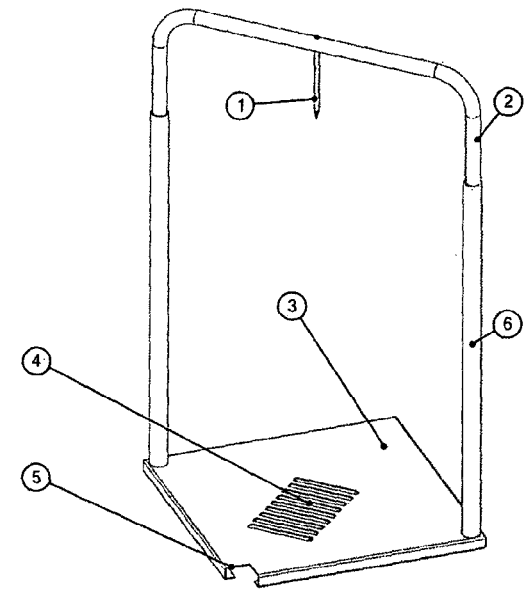
FIG. 2 shows the basket which consists of the hanger (2), which has a nail (1) in the middle of the horizontal part. Also, it shows the base (3) with the embossing area (4) where the stalk comes in contact with the base (3). Also, it shows the specially formed corner (5) where the basket on the corners of the wagon's base comes in contact with the beams (8). Also, is shows the vertical guides (6) of the basket's base, which supports the hanger (2).
Figure 3:
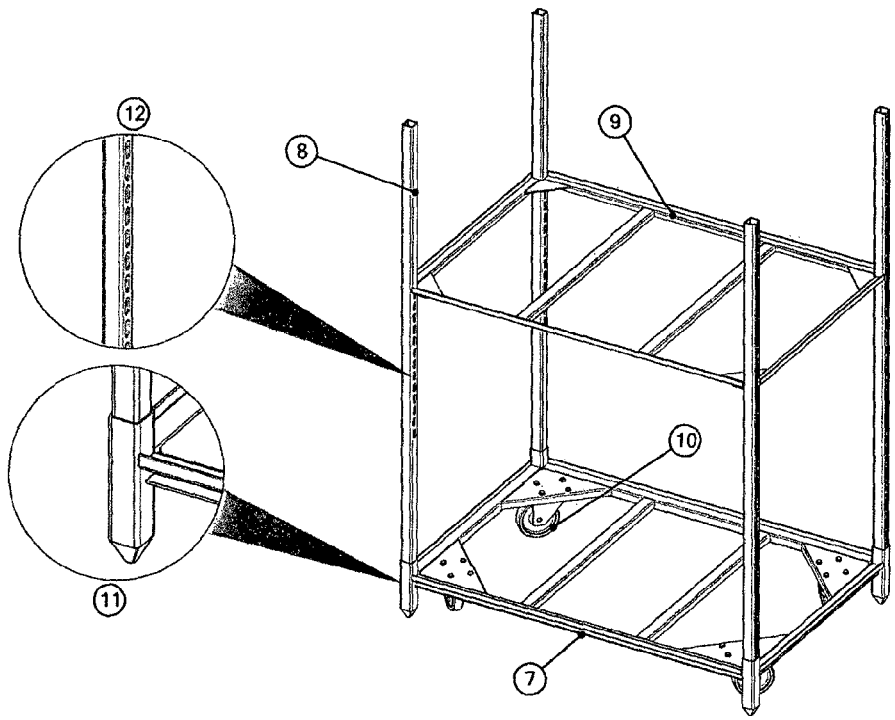
FIG. 3 shows the transportation wagon which consists of the base (7) which has wheels (10) and on the corners has sockets (11) for the beams (8). Along the beams (8) there is a formation (12), which gives the ability to mount and adjust the height of the rack (9).

The invention claimed is:

1. Integrated banana bunch transportation system comprising:
    twelve autonomous baskets, wherein each basket is capable of holding a bunch of bananas and each basket has an upper portion comprising a hanger (1, 2) and a lower portion comprising a base (3, 4, 5, 6), wherein;
        a distance between ends of the hanger (2) is equal to a distance between two columns (6) of the base;
        a cross section of each of the ends of the hanger (2) is slightly different than a cross section of each of the columns (6) of the base, such that the ends of the hanger and the columns are interfitted, allowing slipping along the length of the column (6) of the base such that each basket is configured to telescopically adjust in height, such that each basket is configured to adjust to accommodate bunches of bananas of varying heights;
        a nail is attached in a middle of a horizontal part of the hanger (2), wherein the nail is capable of securing a stalk of the bunch of bananas; and
        the base of each basket has at least an embossed area (4), wherein the embossed area prevents spinning or slipping of a lower part of the bunch of bananas on the base; and
    a wagon comprising wheels, wherein the baskets are placed on the wagon.

2. The integrated banana transportation system according to claim 1, wherein the hanger of each basket comprises an upside-down "U"-shaped hanger.

3. The integrated banana transportation system according to claim 1, wherein the integrated banana transportation system is configured to be assembled and disassembled by hand without use of tools.

4. The integrated banana transportation system according to claim 1, wherein the integrated banana transportation system is configured to disassemble in order to minimize volume of space taken up.

5. The integrated banana transportation system according to claim 1, wherein each basket is usable at a retail point of sale.

6. The integrated banana transportation system according to claim 1, wherein the wagon is configured to carry a bottom group of six baskets and a top group of six baskets, wherein the bottom and top group of baskets are each arranged in two side by side rows of three baskets.

7. The integrated banana transportation system according to claim 1, wherein the wagon further comprises
    a wagon base, wherein the wheels are attached to the wagon base;
    support beams attachable to the wagon base; and
    a rack attachable to the support beams.

* * * * *